United States Patent
Olson et al.

(10) Patent No.: US 7,595,950 B2
(45) Date of Patent: Sep. 29, 2009

(54) ROBUST DATA STORAGE TECHNIQUES FOR TWO-SIDED DATA STORAGE TAPE

(75) Inventors: Larold L. Olson, Lindstrom, MN (US); Brian D. Findlay, Woodbury, MN (US); C. Thomas Jennings, Woodbury, MN (US); Douglas W. Johnson, Stillwater, MN (US); Denis J. Langlois, River Falls, WI (US); Richard W. Molstad, St. Paul, MN (US)

(73) Assignee: Imation Corp., Oakdale, MN (US)

( * ) Notice: Subject to any disclaimer, the term of this patent is extended or adjusted under 35 U.S.C. 154(b) by 605 days.

(21) Appl. No.: 11/391,574

(22) Filed: Mar. 27, 2006

(65) Prior Publication Data

US 2007/0223126 A1 Sep. 27, 2007

(51) Int. Cl.
*G11B 5/09* (2006.01)
(52) U.S. Cl. .................................. 360/48; 360/72.1
(58) Field of Classification Search ............... None
See application file for complete search history.

(56) References Cited

U.S. PATENT DOCUMENTS 6,101,059 A * 8/2000 Wong et al. ................ 360/70
6,940,672 B2 9/2005 Stubbs et al.
6,959,412 B2 10/2005 Silvus et al.
6,999,269 B2 2/2006 Johnson et al.
2005/0044469 A1 * 2/2005 Nakagawa et al. .......... 714/769

FOREIGN PATENT DOCUMENTS

JP 2005-182966 7/2005

OTHER PUBLICATIONS

"What is Raid?—A Word Definition From the Webopedia Computer Dictionary," www.webopedia.com, printed Mar. 9, 2006, 3 pages.

* cited by examiner

*Primary Examiner*—Jason C Olson
(74) *Attorney, Agent, or Firm*—Eric D. Levinson

(57) ABSTRACT

In an embodiment, a data storage tape includes a first side including recorded data and a second side including recorded error correcting code data for the recorded data on the first side. In another embodiment, a data storage tape comprises a first side including recorded data and a second side including a copy of the recorded data. Embodiments of the invention may distribute related data across both sides of a data storage tape and as a result may reduce the probability that a location-dependent error in the data storage tape will result in irretrievable data loss. Embodiments of the invention may be particularly useful for systems that can simultaneously retrieve or record data on both sides of a dual-sided data storage tape.

10 Claims, 2 Drawing Sheets

ROBUST DATA STORAGE TECHNIQUES FOR TWO-SIDED DATA STORAGE TAPE

TECHNICAL FIELD

The invention relates to data storage media and, more particularly, to dual-sided data storage tape.

BACKGROUND

Data storage media are commonly used for storage and retrieval of data, and come in many forms, such as magnetic tape, magnetic disks, optical tape, optical disks, holographic disks, cards or tape, and the like. Magnetic tape media remains an economical medium for storing large amounts of data. For example, magnetic tape cartridges, or large spools of magnetic tape are often used to back-up large amounts of data for large computing centers. Magnetic tape cartridges also find application in the backup of data stored on smaller computers such as desktop or laptop computers.

In magnetic tape, data is typically stored as magnetic signals that are magnetically recorded on the medium surface. The data stored on the magnetic tape is often organized along "data tracks," and read/write heads are positioned relative to the data tracks to write data to the tracks or read data from the tracks. Other types of data storage tape include optical tape, magneto-optic tape, holographic tape, and the like.

Data storage media typically include a section of data set aside as a tape directory, e.g., Media Information Repository (MIR) or Format Identification Data (FID), to store information relative to the tape format and/or data stored on the tape. For example, in data storage tape the directory may include tape information such as the data block number at the start position for every track. The tape directory may also include information regarding the data content and location on the track. Tape directory information may need to be accessed to properly read and write data to the tape.

Data storage on magnetic media is not infallible. For example, a data storage tape may become damaged or dirty, making data on the data storage tape unreadable. The magnetic properties of the media can also degrade to making data unreadable. In order to maintain data integrity in the event data becomes unreadable, many data storage systems include error correcting code (ECC). For example, one simplistic form of error correcting code requires adding a single bit to a portion of data to signify whether the sum of the data bits is odd (1) or even (0). For example, in the byte "1 0 0 0X0 1 1", the first seven bits may represent data with "X" being an unreadable bit, and the last "1" is the ECC. Simple logic can be used to determine X. Specifically, 1+0+0+0+X+0+1=odd, therefore X=1. More complex forms of ECC are also available, such as Reed-Solomon encoding.

SUMMARY

Embodiments of the invention distribute related data, e.g., portions of a tape directory, ECC, or a data file, across both sides of a dual-sided data storage tape. In various embodiments, this distribution can be either a redundant copy of the data or simply a division of the data onto two sides of the magnetic tape.

Readability of data on a data storage tape may be location-dependent. For example, a scratch on the surface of a data storage tape may make a large portion of a single data block unreadable while having little or no effect on adjacent data blocks in the same track. As another example, a manufacturing defect in a data storage tape can create a location-dependent error. Readability issues due to dust and other contaminants are also location-dependent. Distributing related data across both sides of a data storage tape may lower the probability that a location-dependent error will result in irretrievable data loss.

In an embodiment, a data storage tape comprises a first side including recorded data, and a second side including recorded error correcting code data for the recorded data on the first side.

In another embodiment, a data storage tape comprises a first side including a tape directory and a second side including a copy of the tape directory.

In another embodiment, a data storage tape comprises a first side including recorded data, and a second side including a copy of the recorded data.

In another embodiment, a data storage tape comprises a data file consisting of multiple portions, a first side of the data storage tape that includes some portions of the multiple portions, and a second side of the data storage tape that includes the remaining portions of the multiple portions.

Embodiments of the invention may provide one or more of the following advantages. Embodiments of the invention provide for robust dual-sided data storage tape by distributing related data across both sides of the tape. For example, embodiments may limit a data storage tape's susceptibility to location-dependent errors that can impair retrieval of data from the tape. Embodiments of the invention may be particularly useful for systems that can simultaneously retrieve or record data for both sides of a dual-sided tape.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
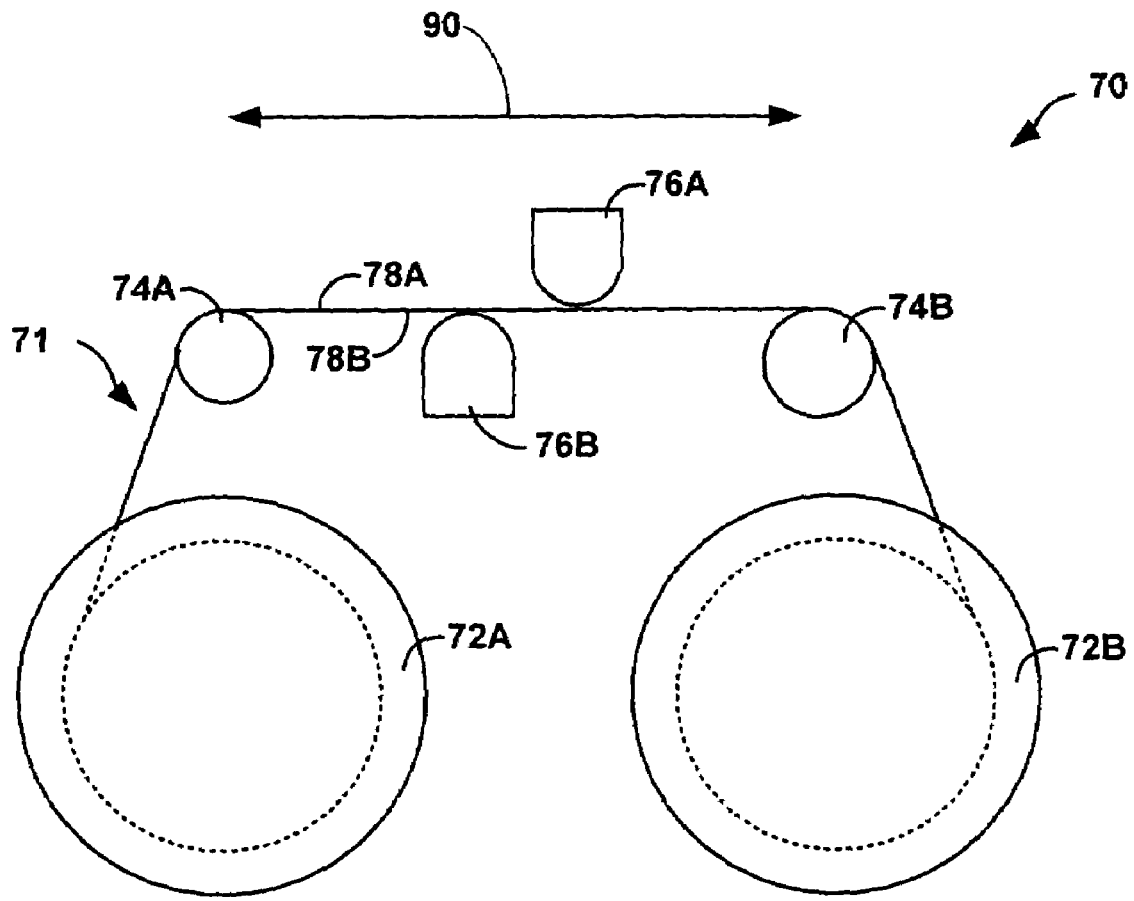
FIG. 1 is a diagram illustrating a system for reading and writing data to both sides of data storage tape.

FIG. 1 is a diagram illustrating one exemplary system 70 for reading and writing data to both sides of data storage tape 71. In particular, system 70 enables the simultaneous recording or erasing of first recorded data to first side 78A and second recorded data to second side 78B. For example, the recorded data may include data files readable by a computer or other device. System 70 is exemplary in the sense that numerous other head arrangements and guide arrangements could also be used that recognize the advantages of the dual sided recording techniques described herein. For example, in other cases a single head could be movable to either side of the medium to read and/or record the data stored on the respective sides.

Exemplary system 70 comprises data storage tape 71 with first side 78A and second side 78B (collectively sides 78), spools 72A and 72B (collectively spools 72) that hold the data storage tape, and a mechanical arrangement of guides 74A and 74B (collectively guides 74) to define a tape path through system 70. In some cases, one or both of spools 72 could be housed within data storage tape cartridge (not shown in the figures). A data storage tape cartridge may also include some or all of guides 74. System 70 includes a head 76A to write or read recorded data to first side 78A of data storage tape 71 as data storage tape 71 is transferred from first spool 72A to second spool 72B. System 70 also includes head 76B, which can simultaneously write or read recorded data to second side 78B of data storage tape 71 as data storage tape 71 is transferred from first spool 72A to second spool 72B. Head 76A is slightly offset from head 76B. Because system 70 provides for simultaneous reading and writing for both sides 78 with write heads 76A and 76B (collectively write heads 76), it allows data storage techniques that positively distribute related data across both sides 78. Such distribution of related data may decrease data storage tape 71's susceptibility to location-dependent defects. Similar techniques, however, could also be used in a system that used the same head to write or read to both sides of the tape. In this case, the head may be mounted on a transport mechanism to position the head with respect to either side of the tape.

Figure 2A:
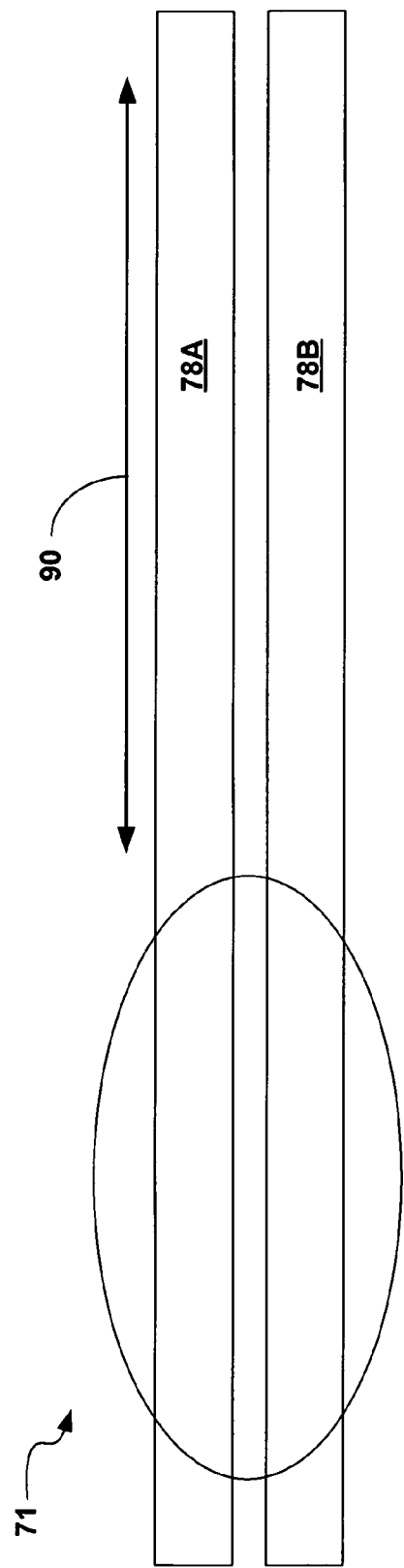
FIGS. 2A-B illustrate a data storage tape including a first side and a second side with each side including data related to data on the other side of the data storage tape.
Figure 2B:
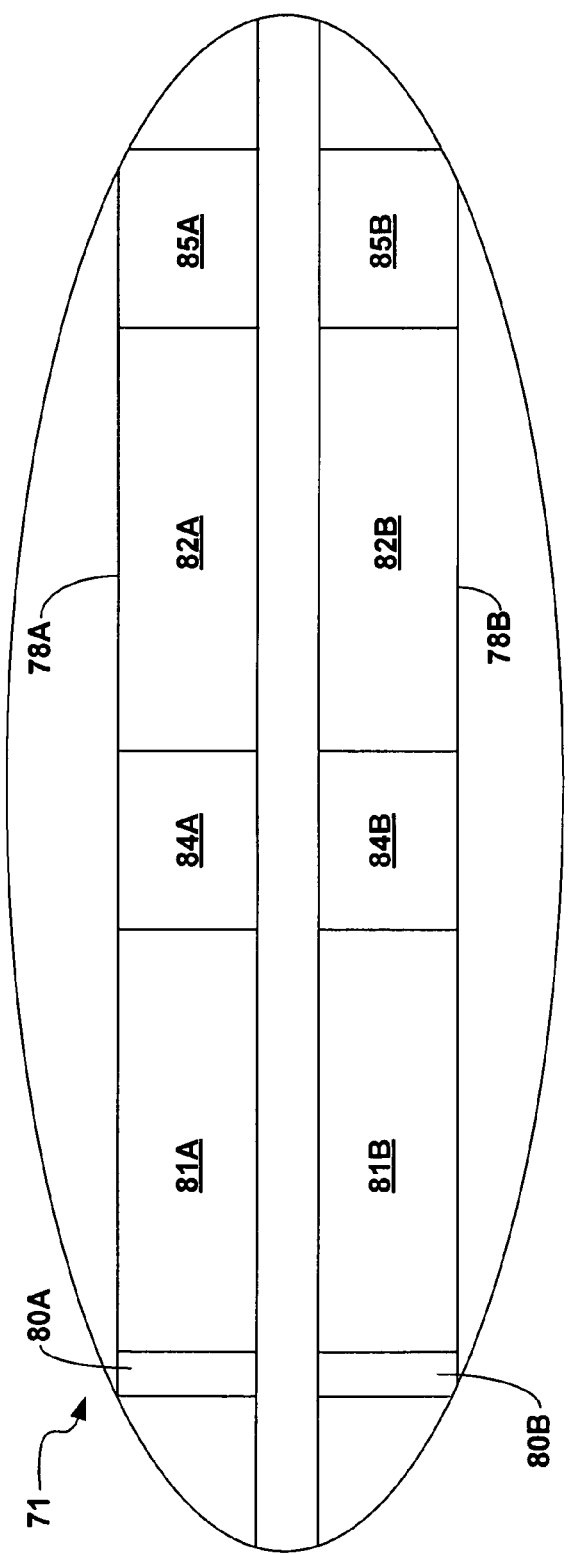

FIGS. 2A-2B illustrate data storage tape 71 including first side 78A and second side 78B with each side 78 including data related to data on the other side of the data storage tape.

Specifically, FIG. 2B illustrates a close-up view of a portion of data storage tape 71, which is shown in FIG. 2A. Data storage tape 71 may be a magnetic data storage tape or other data storage tape.

For simplicity, data storage tape 71 is shown in FIGS. 2A and 2B as having exactly one data track per side. Typically, however, tape 71 may comprise a multitude of data tracks, and possibly one or more servo tracks. The data tracks may also be formed into bands with servo bands separating different data bands that include multiple tracks per band. For example, several data bands on each side of a dual-sided tape may include e.g., sixteen data tracks per band. The invention is applicable to any of these and other configurations of dual-sided data storage tape. In other words, the data may be stored on any number of data tracks, and any number of servo tracks may be included to facilitate precision tracking of the data tracks.

Side 78A includes tape directory 80A, data 81A, ECC 84A, data 82A and ECC 85A. Side 78B includes tape directory 80B, data 81B, ECC 84B, data 82B and ECC 85B. The particular content of these sections of data storage tape 71 will be described with respect to several different embodiments of the invention. In various embodiments, ECC 84A, 84B, 85A and 85B may by derived from data using Reed-Solomon encoding or other ECC techniques.

As a first example, side 78B is a mirror image of side 78A. In this embodiment, tape directory 80B is a copy of tape directory 80A, data 81B is a copy of data 81A, ECC 84B is a copy of ECC 84A, data 82B is a copy of data 82A and ECC 85B is a copy of ECC 85A. This embodiment provides complete redundancy between side 78A and side 78B. In order to retrieve data from both sides 78, two read heads may be used or possibly a single head that can move to either side of the tape via a transport mechanism. In any case, this embodiment may provide redundant functionality on a single tape similar to Redundant Array of Independent Disks (RAID) technology. In particular, this embodiment may be similar to a level 1 RAID system. Because the copy of recorded data on side 78B is approximately linearly coincident with the recorded data on side 78A relative to a direction of travel 90 of data storage tape 71, the level 1 RAID implementation does not need to increase data retrieval time as relative to a comparable single-sided data storage tape, even if readability errors occur for one of sides 78. Other embodiments may use different RAID systems by treating side 78A as a first virtual disk and side 78B as a second virtual disk. In some embodiments, tape directories 80A and 80B may include an indication, such as a status bit, that identifies sides 78A and 78B as including redundant copies of the data, or to identify the medium as supporting virtual RAID-like functionality.

As a second example, tape directory 80B may be a copy of tape directory 80A, but the other portions of sides 78 may differ from one another. For example, tape directories 80A and 80B may include one or more of the following: filemarks, position data of filemarks, a count of the number of write passes for data storage tape 71, a location of a last data block written, a map of a first block written for each track, error conditions of data storage tape 71, a compression status designator for data on data storage tape 71, data storage tape 71 manufacturer information, a write once read many (WORM) write protection designator, a read only write protection designator, a volume serial number, drive information such as system 70 information, firmware information such as for a cartridge including data storage tape, format information for data on data storage tape 71 and/or location information for data files recorded on data storage tape 71. This embodiment may mitigate data loss on data storage tape 71 in the event that either tape directory 80A or 80B is unreadable.

As another example, ECC 84B provides error correction for recorded data 81A and ECC 84A provides error correction for recorded data 81B. In this manner, ECC data is recorded on a separate side from the recorded data. This embodiment may reduce the susceptibility of data storage tape 71 to location-dependent readability errors.

As a fourth example, ECC 84A provides error correction for recorded data 81A and for recorded data 81B. Likewise, ECC 84B is for recorded data 81A and for recorded data 81B. For example, ECC 84B may be a copy of ECC 84A. However, ECC 84B does not have to be a copy of ECC 84A as it may include additional ECC data for both recorded data 81A and 81B. Like the other examples, this example may reduce the susceptibility of data storage tape 71 to location-dependent readability errors.

For any of the described examples and obvious variations thereof, data 81A, data 81B data 82A, data 82B may include one or more data files. For example, data 81A and data 81B may each include portions of a first data file, while data 82A and data 82B may include portions of a separate data file. As another example, data 81A and data 81B may each include redundant copies of a first data file, while data 82A and data 82B may include distinct portions of a second data file. In such an example, data 81A and data 81B may include information, such as respective filemarks, to indicate that that the first data file is redundantly copied on data 81A and data 81B. Data 82A and data 82B may also include information, such as one or more filemarks, to indicate that data storage tape 71 does not include a copy of the second data file, but that is divided among data 82A and data 82B. As such, the information that indicates tape 71 includes a copy of a first portion of the data files and the information that indicates tape 71 does not include a copy of a second portion of the data files may be stored as filemarks within the data files themselves.

In some embodiments, a single data file may include multiple portions which are divided among data 81A, data 81B, data 82A, and data 82B or even more separate sections of data. For example, Reed-Solomon encoding generally utilizes a consistent number of data blocks with a consistent number ECC data. In this case, data 81A, data 81B, data 82A and data 82B may each include one-hundred-eight data blocks and ECC 84A, ECC 84B, ECC 85A and ECC 85B may each include twenty data blocks. In such a system, the number of sections of data, e.g., data 81A, data 81B, data 82A and data 82B, occupied by a data file is dependent on the size of the data file.

As such, some of the multiple portions of the data file are included on side 78A and the remainder of the multiple portions are included on side 78B. The portions of the data file on the side 78A may be approximately linearly coincident with the remaining portions of the data file on side 78B. However, additional portions of the data file may also be stored on a different data storage tape, e.g., if the data storage capacity of data storage tape 71 is less than the size of the data file. Data storage tape 71 may also include additional data files comprising multiple portions, wherein each of the additional data files includes some portions on side 78A and remaining portions on side 78B.

In various embodiments having more than one data track per side of data storage tape 71, each track on a side may include related data, or each track on a side may include data unrelated to data stored on other tracks on the side. Because data tracks on a side of a data storage tape are physically separate from one another, distributing related data among data track on the same side may produce some of the same benefits as distributing related data among both sides of the data storage tape.

Embodiments of the invention may distribute related data amongst more than one data track on the same side of a data storage tape in addition to distributing data among both sides of the data storage tape. In this case, redundancy is provided across a given surface of the tape and across the different sides of the tape, thereby providing multiple levels or redundancy and protection against data corruption or data loss.

Various embodiments of the invention have been described. However, modifications can be made to the described embodiments without departing from the spirit and scope of the invention. For example, while data storage tapes are generally described as being magnetic data storage tapes, optical data storage tapes, magneto-optic data storage tapes, and holographic data storage tapes may also use the dual-sided redundancy techniques described herein. Additionally, any of the various embodiments described herein may be combined. For example, a data storage tape may include a first portion with a mirror image of data on both sides of the tape and a second portion where only ECC data is divided among both sides of the tape, but data files are each only on a single side of the tape. These and other embodiments are within the scope of the following claims.

The invention claimed is:

1. A data storage tape comprising:
    a first side including recorded data; and
    a second side including first error correcting code data for the recorded data on the first side, wherein the first side further includes second error correcting code data for the recorded data and wherein the first error correcting code data includes additional information relative to the second error correcting code data.

2. The data storage tape of claim 1, wherein at least one of the first and second error correcting code data includes parity bits derived using Reed-Solomon encoding.

3. The data storage tape of claim 1, wherein the data storage tape is a magnetic data storage tape.

4. A data storage tape comprising:
    a first side including a tape directory; and
    a second side including a copy of the tape directory, wherein the first side includes recorded data and the second side includes error correcting code data for the recorded data on the first side.

5. The data storage tape of claim 4, wherein the tape directory includes information that indicates the tape includes the copy of the tape directory.

6. The data storage tape of claim 4, wherein the tape directory includes format information regarding the data storage tape.

7. A data storage tape comprising:
    a first side including recorded data, wherein the recorded data includes multiple data files;
    a second side including a copy of some of the recorded data;
    first information that indicates that the second side of the data storage tape includes a copy of a first portion of the data files; and
    second information that indicates that the second side of the data storage tape does not include a copy of a second portion of the data files, wherein the first portion is distinct from the second portion.

8. The data storage tape of claim 7, wherein the copy of some of the recorded data is approximately linearly coincident with the recorded data relative to a direction of travel of the data storage tape.

9. The data storage tape of claim 7, wherein the recorded data includes error correcting code data.

10. The data storage tape of claim 7, wherein the first information that indicates that the data storage tape includes a copy of a first portion of the data files and the second information that indicates the data storage tape does not include a copy of a second portion of the data files is stored as filemarks within the data files.

* * * * *

UNITED STATES PATENT AND TRADEMARK OFFICE
CERTIFICATE OF CORRECTION

PATENT NO. : 7,595,950 B2 Page 1 of 1
APPLICATION NO. : 11/391574
DATED : September 29, 2009
INVENTOR(S) : Olson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 791 days.

Signed and Sealed this

Twenty-eighth Day of September, 2010

David J. Kappos
*Director of the United States Patent and Trademark Office*